Patented June 16, 1925.

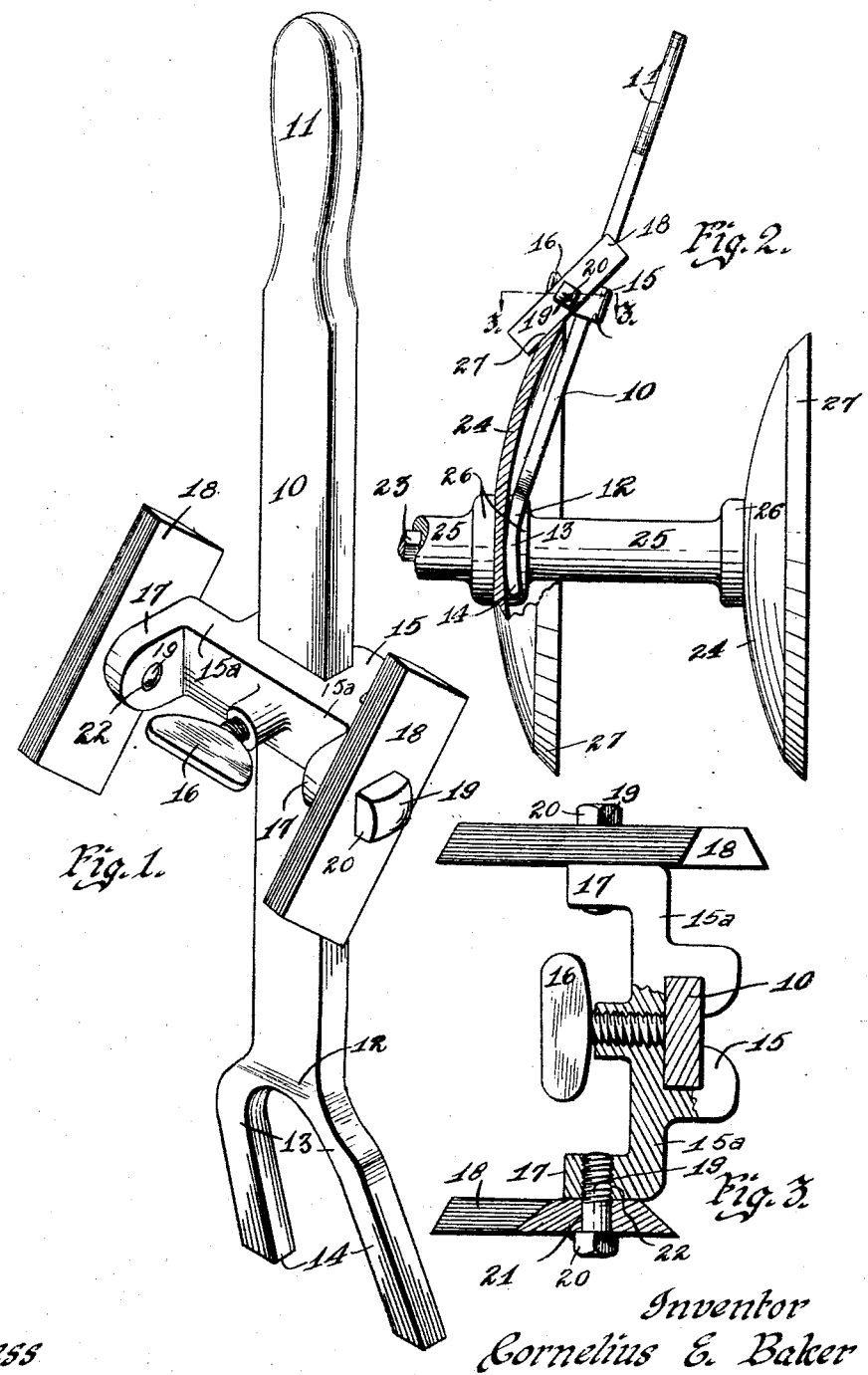

1,542,757

UNITED STATES PATENT OFFICE.

CORNELIUS E. BAKER, OF INDIANOLA, IOWA.

DISK SHARPENER.

Application filed June 26, 1924. Serial No. 722,574.

*To all whom it may concern:*

Be it known that I, CORNELIUS E. BAKER, a citizen of the United States, and a resident of Indianola, in the county of Warren and State of Iowa, have invented a certain new and useful Disk Sharpener, of which the following is a specification.

The purpose of my invention is to provide a disk sharpener of simple, durable and inexpensive construction.

More particularly, it is my purpose to provide a disk sharpener of very cheap and simple construction, having a bar formed with a handle portion at one end and with an offset portion at its other end having a bifurcated part, and to mount on said bar a collar, and a set screw or other simple means for locking the collar at different heights on the bar, which collar is provided with opposite spaced laterally extended arms projecting in the same direction as the offset portion, and to mount on said arms a pair of cutters or sharpeners, so that the sharpeners will engage one side of the disk, while the bar stands on the other side thereof, whereby the movement of the bar away from the disk tends to press the cutters into engagement with the disk for sharpening it.

With these and other objects in view, my invention consists in the construction, arrangement and combination of the various parts of my disk sharpener whereby the objects contemplated are attained, as hereinafter more fully set forth; pointed out in my claim, and illustrated in the accompanying drawings, in which:

Figure 1 is a perspective view of a disk sharpener embodying my invention.

Figure 2 is an elevation of a portion of the disk, parts being shown in section, my sharpener being illustrated mounted in position for use; and Figure 3 is a sectional view of the sharpener, one end of the collar and other cutter being shown in plan view.

In the accompanying drawings, I have used the reference numeral 10 to indicate generally a bar forming a portion of my disk cutter and having at one end the handle portion 11, and at the other end bent at 12 terminating in a yoke 13, bifurcated for forming the spaced fingers 14.

On the bar 10 is adjustably mounted a collar 15, through which extends a set screw 16 for locking the collar at different heights on the bar 10.

The collar 15 has portions 15ª projecting away from the bar 10 on opposite sides thereof and terminating in offset arms 17 projecting away from the collar in an opposite direction to the yoke 13.

Cutters 18 are detachably and adjustably secured to the arms 17 by means of bolts 19, whereby the cutters may be reversed or set at any desired angle.

In this connection, it should be mentioned that the bolts 19 have polygonal heads 20 and extend through holes 21 in the cutters 18, and are screwed into threaded holes 22 in the arms 17.

In Figure 2, I have shown the portions of the disk structure including an axle 23, disks 24 and spacer sleeves 25. The spacer sleeves 25 have shoulders 26 on each side of each disk 24.

In the actual use of my improved disk sharpener, the bar 10 is placed in inclined position as shown adjacent to the concave side of the disk with the fingers 14 receiving between them one of the spacing sleeve shoulders 26, as illustrated in Figure 2.

I find that the fingers 14 must be so arranged that the bar 10 may stand inclined from its upper end, into the concave of the disk, substantially as shown in Figure 2, to get the best results.

The cutters 18 then project downwardly over the convex side of the disk, as illustrated, in position for sharpening the edge of the disk as at 27.

It will be seen that when the handle portion 11 of the bar 10, as shown in Figure 2, is pushed toward the right, the fingers 14 will engage the disk 24 and the cutters 18 will be pressed against the edge of the disk to be sharpened.

The pressure may be varied according to the circumstances.

The person sharpening the disk may walk behind it or may sit on the disk frame and manipulate the shapener.

Changes may be made in the details of the structure and arrangement of my improved disk sharpener without distinguishing from the real spirit and purpose of my invention, and it is my intention to cover by the patent to be issued hereon, any such modifications or changes of structure, which may be embodied within the scope of my claim.

I claim as my invention:

A disk sharpener comprising a bar having at one end a handle portion and at the other end a slightly offset bifurcated portion, a collar slidably mounted on said bar having spaced arms, offset on the same side of the bar as said offset portion, means for securing the collar at various points on the bar, and sharpener devices bolted on said arms.

Des Moines, Iowa, June 19, 1924.

CORNELIUS E. BAKER.